United States Patent [19]

Keller et al.

[11] Patent Number: 4,925,134

[45] Date of Patent: May 15, 1990

[54] HIGH TEMPERATURE HEAT SHIELD SYSTEM

[75] Inventors: Karl Keller, Munich; Herbert Grallert, Unterhaching; Wolfgang Keinath, Hoehenkirchen, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 281,817

[22] Filed: Dec. 8, 1988

[30] Foreign Application Priority Data

Dec. 9, 1987 [DE] Fed. Rep. of Germany ....... 3741733

[51] Int. Cl.$^5$ ............................................. B64G 1/00
[52] U.S. Cl. .............................. 244/158 A; 244/117 A
[58] Field of Search ....................... 244/117 A, 158 A; 428/593, 594, 650; 220/436, 438, 442, 450

[56] References Cited

U.S. PATENT DOCUMENTS

| | | | |
|---|---|---|---|
| 1,625,061 | 4/1927 | Trout | 428/593 |
| 2,746,892 | 5/1956 | Elfving | 220/442 |
| 3,009,600 | 11/1961 | Matsch | 220/450 |
| 4,344,591 | 8/1982 | Jackson | 428/594 |
| 4,456,208 | 6/1984 | MacConochie et al. | |

Primary Examiner—Joseph F. Peters, Jr.
Assistant Examiner—Anne Sartelle
Attorney, Agent, or Firm—W. G. Fasse; . D. H. Kane, Jr

[57] ABSTRACT

A high temperature heat shield system for re-entry vehicles and high speed aircraft is assembled from separate insulating panels made of metal foil layers diffusion soldered together and with a ceramic fiber material filled into interspaces between the metal foil layers. In this arrangement structural metal foil layers carry mechanical loads while separate reflecting foil layers and the ceramic fiber material are non-load bearing.

23 Claims, 3 Drawing Sheets

HIGH TEMPERATURE HEAT SHIELD SYSTEM

FIELD OF THE INVENTION

The invention relates to a high temperature heat shield system, especially for spacecraft re-entering the earth's atmosphere, and for high speed aircraft. The system is assembled of multiple layers of metal foil and fiber layers, such as ceramic fiber mats arranged between the metal foil layers.

BACKGROUND INFORMATION

U.S. Pat. No. 4,456,208 discloses a heat shield having a metal box construction with a filling of fiber material and possibly also including reflecting foil layers. The known heat shield does not provide for any easy reusability of the separate elements of the heat shield. Further, the material expenditure and the weight of the known heat shield system are quite high. The thermal insulation of the known heat shield is provided by the fiber material filling. The metal cover of the box must be relatively strong, stiff, and therefore, heavy, for mechanical reasons, but provides only insignificant additional thermal insulation.

U.S. Pat. No. 4,344,591 discloses a similar heat shield system having several layers of metal panels which are constructed as a metal multiwall structure combined with one or two layers of high density ceramic fiber mats. For high temperatures these known panels are either relatively heavy or relatively thick so that they lead to a disadvantageous increase of the outer diameter of the aircraft or spacecraft or instead, require a corresponding decrease of the usable inner space of the aircraft or spacecraft.

OBJECTS OF THE INVENTION

In view of the foregoing it is the aim of the invention to achieve the following objects singly or in combination:

to construct a high temperature heat shield system especially for high speed aircraft and spacecraft including re-entry vehicles, which system uses removable and reusable components;

to construct such a heat shield system with load bearing metal foil layers having a high strength to thickness ratio achieved by corrugating or dimpling the foil layer in combination with non-load bearing ceramic layers which provide good thermal insulation;

to combine the advantages of the load bearing layers providing mechanical strength with the advantages of non-load bearing layers providing heat insulating characteristics;

to construct such a heat shield system in such a manner and using such materials that a lightweight and small thickness is achieved for the insulation panels;

to allow the specific insulating characteristics of a panel of such a heat shield system to be adjusted by appropriately selecting the materials of the panel combination while maintaining the same construction; and to increase the insulating value of such insulating panels by reducing the thermal conduction through gas in the fiber material and to construct the panels so that heat which is stored in the heat shield system during re-entry into the earth's atmosphere is to a greater extent discharged or given off externally during flight at lower flight altitudes.

SUMMARY OF THE INVENTION

The above objects have been achieved in a high temperature heat shield system according to the invention, wherein separate layered panels are assembled to form the heat shield. Each panel includes a plurality of at least three different layered structures. A first or outer layered structure includes an outer metal foil, an inner or inwardly facing metal foil and a dimpled metal foil sandwiched between the outer and inner metal foil. A second layered structure is a stack of corrugated metal foil layers with the direction of corrugation rotated by 90° between neighboring layers and with a ceramic fiber layer having a specific thermal insulating value arranged between neighboring corrugated foils. A third layered structure includes an integrally stiffened substrate or baseplate including two metal foil layers with a dimpled metal foil sandwiched between the metal foil layers in a construction similar to the first or outer layered structure. A fourth optional layered structure in a panel of the invention is a stack of ceramic fiber layers separated from one another by respective non-load bearing infrared reflecting, foil layers. If the fourth layered structure is used it is arranged between the second and third layered structures. The load bearing foil layers of the heat shield system may be connected to each other, for example, by means of diffusion soldering.

The materials for the insulation panels are selected according to the expected operating temperatures, whereby the metal foil layers may be selected from, for example titanium alloys, nickel alloys, cobalt alloys, or other alloys including refractory metal alloys and the highly reflective radiating foils may be made of aluminum coated Kapton (R.T.M.), aluminum foils, gold foils, nickel foils, copper foils or gold coated ceramic foils. The ceramic fiber filling has fibers with a higher proportion of $Al_2O_3$ on the hot side or outer side of the panel and fibers with a higher proportion of $SiO_2$ on the cold side or inner side of the panel. The density of the fiber mats increases from the outer side to the inner side while the average fiber diameter decreases from the outer side to the inner side. The fiber material is selected due to the lowest specific fiber density for the envisaged temperature range.

Thermal expansion joints are provided between neighboring panels of the heat shield system. Flexible ceramic mats fill and insulate the expansion gaps. Snap catch fasteners or catch hooks attach to the aircraft cell structure and engage the separate panels in a removable manner. A polyimide foam layer or e.g. a Homers felt, fills a space between the baseplate of the separate panels and the outer skin of the aircraft fuselage or spacecraft body wall.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1A:
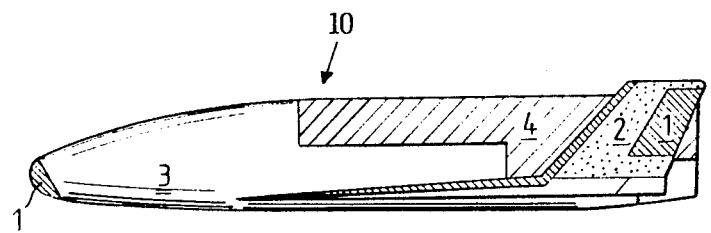
FIG. 1a is a side view of an aircraft or re-entry spacecraft schematically showing four different temperature zones, correspondingly different panels of the present invention are attached to different zones of the aircraft structure.
Figure 1B:
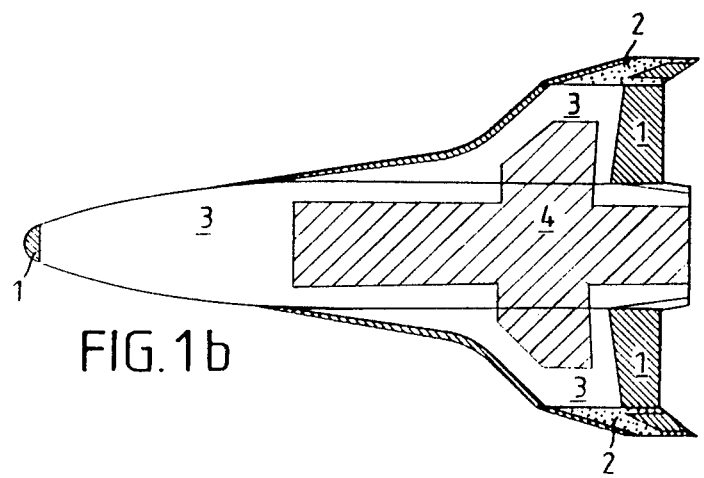
FIG. 1b is a top view of the aircraft of FIG. 1a showing the distribution of the four different temperature zones as seen from above.
Figure 1C:
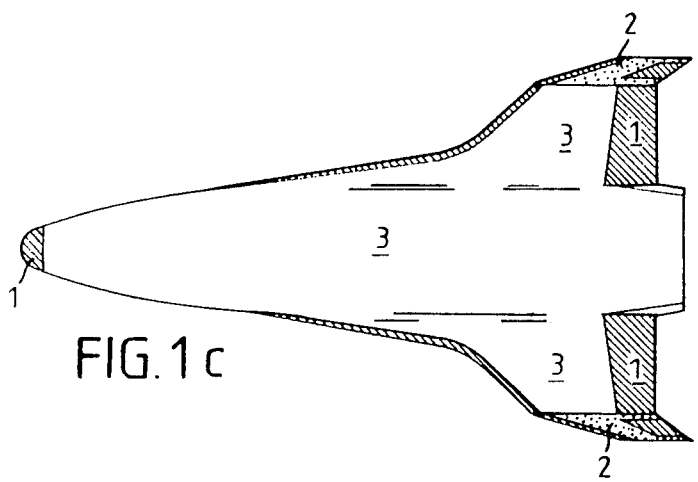
FIG. 1c is a bottom view of the aircraft of FIG. 1a, showing the distribution of three of the four temperature zones as seen from below.

FIGS. 1a, 1b, and 1c show four different "heat load zones" on the outer surface of a spacecraft 10 during re-entry into the earth's atmosphere or analogously for a high speed aircraft. The areas identified as zone 1, that is, the nose leading edges, and the control surfaces of the craft 10 are subjected to the highest temperatures and are generally realised as hot structures. Strippled zones 2 are at a slightly lower temperature while zones 3 are at an even lower temperature and zones 4 are at the coolest temperature. Accordingly, these zones 2, 3, 4 require a respectively decreasing level of heat shielding. The invention provides a high temperature heat shield system made of separate insulating panels 11 which are described in detail below with reference to FIGS. 2, 2a, 3, and 4. Each panel is made up of at least three layered structures.

The separate panels 11 are arranged to form a continuous shield attached to the cell or body structure of the craft. The basic construction of all the separate layered panels 11 remains the same but the number of layered structures in each panel may vary and so may the materials in the layered structures which are selected for providing the appropriate degree of heat shielding protection in the different heat load zones 2 to 4 and accordingly for the control surfaces of zone 1 if there control surfaces are not realised as hot structures. The required protection is provided in each of the zones without a significant weight addition and without dimensional penalties.

Figure 2:
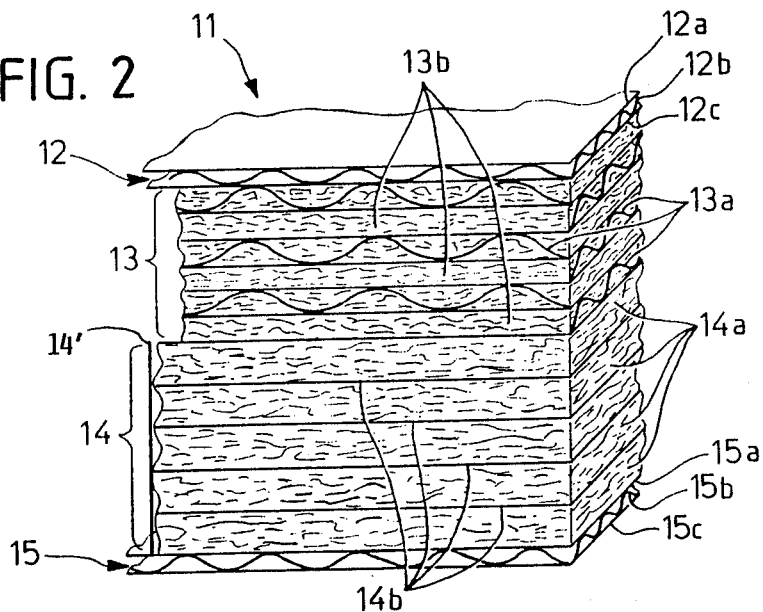
FIG. 2 is a sectional perspective view through a heat shield panel construction according to the invention.

As shown in FIG. 2 a panel 11 of a heat shield system of the invention has, for example, four main layered structures 12, 13, 14 and 15. The first layered structure 12 comprises an outer metal foil layer 12a with a wall thickness of approximately 100 $\mu$m, a nubbed or dimpled metal foil layer 12b with a wall thickness of approximately 70 $\mu$m and an inner metal foil layer 12c with a wall thickness of approximately 50 $\mu$m. The dimpled metal foil layer 12b is sandwiched between the metal foil layers 12a and 12b and the respective foil layers may be connected to each other, for example by means of diffusion soldering at points or regions where the foils contact each other. The spacing between dimples of the dimpled foil layer 12b is approximately 20 mm and the total thickness of the first layered structure 12 is approximately 4 mm.

The second layered structure 13 comrpises a series of stacked corrugated metal foil layers 13a which are successively rotated by 90° so that the valleys and ridges of one foil extend perpendicularly to the valleys and ridges in the other neighboring foil. The foils are also diffusion soldered together where the perpendicularly crossing corrugations of neighboring layers 13a contact each other. The interspaces between the corrugated layers 13a are filled with ceramic fiber layers 13b having a specific thermal insulating value selected in accordance with the requirements of the several zones 1 to 4. Each corrugated metal foil layer 13a has a wall thickness of approximately 50 $\mu$m and a corrugation height of approximately 6 mm while the on-center corrugation spacing from peak to peak is approximately 30 mm.

The third layered structure 15 is an integrally stiffened substrate or baseplate comprising a metal foil layer 15a approximately 30 $\mu$m thick. A nubbed or dimpled metal foil intermediate layer 15b approximately 70 $\mu$m thick and a metal foil layer 15c approximately 50 $\mu$m thick. In this baseplate layer 15 the dimpled spacings, the layer thickness and the interconnection of adjacent layers is essentially the same as that described above for the first layered structure 12. In this panel structure the first layered structure 12 forms an outer skin layer while the third layered structure 15 is a base layer facing the aircraft fuselage.

Figure 2A:
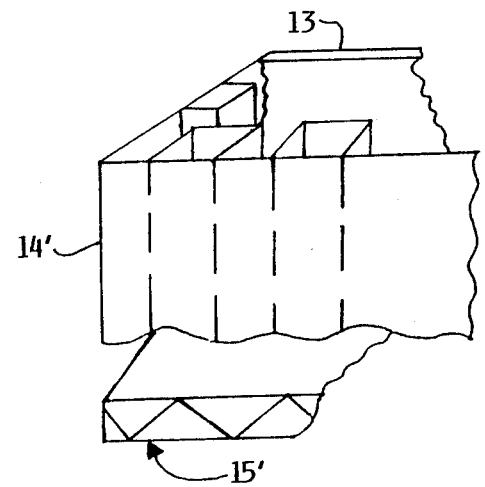
FIG. 2a is a broken away perspective view of a metal foil frame used in FIG. 2.

Depending on the heat insulation requirements, a fourth layered structure 14 comprises a series of stacked ceramic fiber layers 14a separated from one another by loosely arranged non-load bearing highly reflecting foil layers 14b. This fourth layered structure is surrounded or enclosed by a corrugation stiffened metal foil frame 14' only shown as a line in FIG. 2 for transmitting the occurring mechanical loads from the second layered structure 13 to the third layered structure 15 so that no loads are applied to the ceramic fiber layers 14a or the reflecting foil layers 14b of the optional fourth layered structure. This load transferring by the frame 14' can also be achieved by an appropriate grid structure or multi-walled structure, depending on weight considerations. FIG. 2a shows perspectively and in broken away fashion, a frame 14' between the base plate layer 15 and the layered structure 13.

The appropriate material for constructing the panel 11 must be selected depending on the specific application of each panel 11, namely the expected operating temperatures and depending upon the specific aircraft and the respective heat zone 2, 3, or 4. For example, the various metal foils of the layered structures 12, 13, and 15 may be made—as referenced elsewhere—of titanium alloys such as $Ti_6Al_4V$ for operating temperatures up to 500° C., or nickle alloys such as Inconel 218 (RTM), for temperatures up to 900° C., or cobalt alloys such as Flayner 788 (RTM) for temperatures up to 1050° C., or nickle chrome alloys such as TDNiCr (Thorium detached Nickel-chrome alloy), for temperatures up to 1200° C., or molybdenum alloys such as TZM (Titanium-Zirconium-Molybdenum alloy) for temperatures up to 1300° C. The latter (TZM) has to be coated by an oxidation protective material.

The radiation reflecting foil layers 14b are made of non-load bearing, high reflecting and extremely thin foils selected from, for example aluminum coated Kapton (R.T.M.) polyimide foils 6 $\mu$m thick for temperatures up to 400° C.; aluminum foils 5 $\mu$m thick for temperatures up to 550° C., or gold foils, nickle foils, copper foils, or gold coated ceramic foils of minimum available thickness for temperatures up to 900° C.

The fibers of the ceramic fiber fillings 13b and 14a have a higher proportion of $Al_2O_3$ such as, for example the fiber material referred to as "Fiberfrax H" (R.T.M.)

ceramic fibers made of $Al_2O_3$ and $SiO_2$ on the hotter side or toward the outside of the insulating panel 11. On the other hand, on the colder or inner side of the insulating panel 11 the fiber material has a higher proportion of $SiO_2$ (up to 99.9%) or a higher proportion of borosilicate glass such as, for example microlite fibers (by Johns Manville Company). The density of the fiber filling increases from the outer layer to the inner layer from a value of approximately 8 kg/m$^3$ to 40 kg/m$^3$. The average fiber diameter of the fiber material decreases from the outside toward the inside from approximately 4 $\mu$m to approximately 0.4 $\mu$m. This variation of material characteristics across the thickness of the insulating panel 11 measured perpendicularly to the surface of the layered structures achieves the desired results that for flight altitudes less than 50 km and a correspondingly reduced aero-thermic heating, the heat shield preferably externally discharges or gives off previously stored heat.

The outermost metal foil 12a is coated on its outer surface with a coating or film having a high thermal optic emission coefficient which may be as high as $\epsilon \geq 0.9$ depending on the coating material such as $Al_2O_3/SiO_2$ layers of a few microus thickeners, whereby, a large portion of the incident heat is immediately radiated off. The inner surface of the metal foil 12a as well as all of the other interior foil layers such as 12b, 12c, and 13a have a low emission coefficient with $\epsilon < 0.1-0.3$. Such emission coefficient values can be achieved by an appropriate surface treatment making the foil surfaces oxidation resistant, e.g., by an Pt- or Au-vapor coating.

Figure 3:
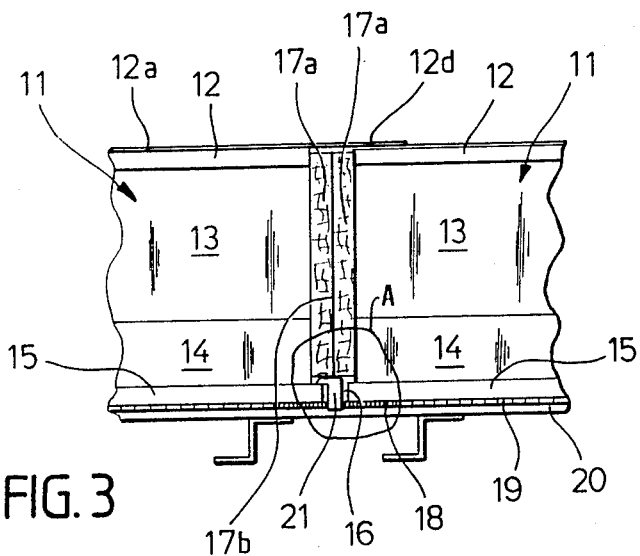
FIG. 3 is a simplified side view partly in section through the area of a joint between two neigh boring panels with a corresponding expansion gap and a gap cover, wherein the panels are attached to the air frame cell structure of an aircraft or spacecraft.
Figure 4:
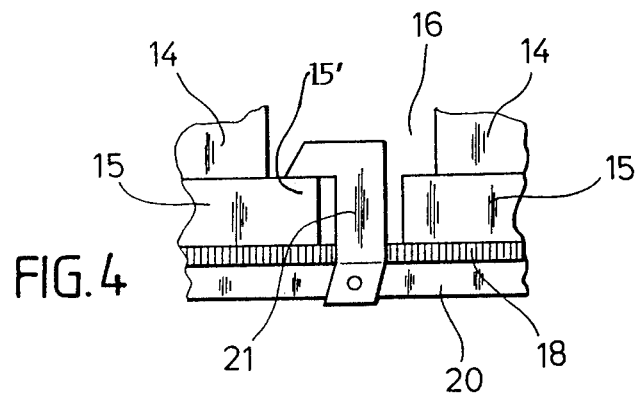
FIG. 4 is an enlarged detail A of FIG. 3, showing a snap catch fastener engaging the baseplate of an insulating panel according to the invention.

Referring to FIGS. 3 and 4, the different thermal expansions of the material of the heat shield relative to the material of the air frame of the aircraft are compensated in so-called thermal expansion gaps 16 dimensioned so that when the heat shield is at its maximum temperature and corresponding maximum expansion, the gaps 16 are nearly closed to the outside. The outermost metal foil 12a has an extension 12d which covers the expansion gap 16 by reaching over the adjacent panel 11. A flexible ceramic mat 17a such as a (Johns Manville) Dynaflex mat is glued to the lateral edges of the panels 11 so that the respective adjacent ceramic mats 17a fill the space of the expansion gap 16. The ceramic mats 17a are flexible and compressible so that, as the width of the expansion gap 16 changes in response to the changing expansion of the panels 11, the mats 17a expand or compress to fill the expansion gap 16 at all times.

The layered structures 12 to 15 of each panel 11 are depressurised and vented through a relatively low number of perforations provided in the foils 17a. A compressed ceramic paper combination strip 18 approximately 1 to 3 mm thick is arranged below each expansion gap 16. Each ceramic paper strip 18 is approximately 5 cm wide. The rest of the surface area between the panel baseplate 15 and the air frame structure 20 is, for example, filled with a Nomex (R.T.M.) felt of heat resistant nylon of uniform thickness or with a polyimide foam layer 19.

As especially shown in the detail of FIG. 4, snap catch fasteners 21 such as spring loaded catch hooks are provided on the flying body such as the frame structure 20 of the craft for securing the separate insulation panels 11. Any type of conventional fastener may be used that is suitable for securing the flat panels in a releasable manner to the surface of the flying body, for example slide and lock rails, bayonet type fasteners, Velcro (R.T.M.) or the like are suitable for this purpose. The snap catch fasteners 21 are, for example, made of a titanium alloy, engage an edge 15' of the lower layered structure 15 forming a baseplate of each panel 11. A slight free play is allowed for easily operating the snap catch fastener 21 and for allowing a compensation for differing thermal expansions of the baseplate structure 15 and the air frame structure 20, but the free play remains small enough that an accidental disengaging of the snap catch fastener 21 is not possible. The panels 11 may easily be snapped into place by engaging one end of the panel 11 under the cover plate extension 12d of the adjacent panel and then snapping the baseplate structure 15' under the snap catch fastener 21. The panels may easily be removed to be exchanged or re-used by pushing an appropriate tool through the expansion gaps 16 to push back and disengage the snap catch fasteners 21. In this case, simply the flexible ceramic mats 17a may have to be replaced.

Incidentally, any of the ceramic fiber material layers may comprise fibers coated with a highly reflective coating. Further, any of the ceramic fiber materials may comprise highly reflective particles interspersed among the ceramic fibers.

References:

Ti6A14V is a titanium alloy supplied e.g. by ZAPP (Federal Republic of Germany), Contimet (Federal Republic of Germany);

IN718 is a nickel alloy supplied by INCO (Great Britain), ZAPP (Federal Republic of Germany);

HS188 is a cobalt alloy supplied by ZAPP (Federal Republic of Germany), Cabot (U.S. of America);

TD NiCr is a thorium dotated nickel-chrome alloy supplied e.g. by ZAPP (Federal Republic of Germany);

TZM is a molybdenum alloy supplied e.g. by Plansee (Austria), Climax (U.S. of America);

Fiberfrac H is an alumina fiber with 53% $Al_2Ol_3$ content supplied by Carborundum (U.S. of America);

Dynaflex is a silica fiber mat supplied by Johns Manville (U.S.A. of America);

Microlite is a borosilicate glass fiber matt supplied by Johns Manville (U.S. of America).

Although the invention has been described with reference to specific example embodiments, it will be appreciated, that it is intended to cover all modifications and equivalents within the scope of the appended claims.

We claim:

1. A high temperature heat shield system, especially for thermally protecting a flying body, comprising a laminate including a plurality of layered structures forming individual panels, each panel comprising at least a first outermost layered structure (12), a second intermediate layered structure (13), and a third innermost layered structure (15) arranged closest to said flying body, said first outermost layered structure (12) comprising an outer metal foil layer, an inner metal foil layer, and a dimpled metal foil layer arranged between said outer and inner metal foil layers, said second intermediate layered structure (13) comprising a plurality of corrugated metal foil layers stacked one on top of another and rotated respectively by 90°, whereby corrugations of neighboring corrugated metal foil layers cross each other perpendicularly to form spaces between said corrugations, and ceramic fiber material layers arranged respectively in each of said spaces between said corrugations, and said third innermost layered structure (15) comprising an outer metal foil layer, an inner metal foil layer, and a dimpled metal foil layer arranged between said outer and inner metal foil layers to form an integrally stiffened baseplate, and wherein said ceramic fiber material layers comprise a varying fiber material and layer composition with a higher content of $Al_2O_3$ in the fibers and a relatively low layer density of approximately 8 kg/m$^3$ and a relatively high average fiber diameter of approximately 4 μm near said first outermost layered structure, and a higher content of $SiO_2$ in the fibers and a relatively high layer density of approximately 40 kg/m$^3$ and a relatively low average fiber diameter of approximately 0.4 μm near said third innermost layered structure.

2. The heat shield system of claim 1, wherein each panel further comprises a fourth layered structure (14) arranged between said second and said third layered structures (13 and 15), and comprising a plurality of further ceramic fiber material layers, and a plurality of loose non-load bearing heat reflecting foil layers stacked alternatingly with and separating said ceramic fiber layers.

3. The heat shield system of claim 2, further comprising a load bearing means arranged around said fourth layered structure (14) for transmitting mechanical loads from said second intermediate layered structure (13) to said third innermost layered structure (15).

4. The heat shield system of claim 2, wherein said reflecting foil layers are made of at least one material selected from coated Kaptan (R.T.M.) foil with a thickness of approximately 6 μm for operating temperatures up to 400° C., aluminum foil with a thickness of approximately 5 μm for operating temperatures up to 550° C., gold foil, nickel foil, copper foil each with a thickness of approximately 10 μm for operating temperatures up to 900° C. or coated ceramic foil.

5. The heat shield system of claim 2, further comprising means for mechanically connecting said second intermediate layered structure to said third innermost layered structure for transferring mechanical loads from said second to said third layered structure, whereby said mechanical loads bypass said fourth layered structure located between said second and third layered structures.

6. The heat shield system of claim 2, wherein any of said ceramic fiber material layers comprises ceramic fibers coated with a highly reflective coating.

7. The heat shield system of claim 2, wherein any of said ceramic fiber material comprises highly reflective particles interspersed among said ceramic fibers.

8. The heat shield system of claim 1, wherein said first mentioned dimpled metal foil layer is connected to said outer metal foil layer and to said inner metal foil layer of said first outermost layered structure (12), and wherein said second mentioned dimpled metal foil layer is connected to said outer and to said inner metal foil layers of said third innermost layered structure (15).

9. The heat shield system of claim 8, wherein said dimpled metal foil layers are diffusion soldered to the respective outer metal foil layers and to the respective inner metal foil layers.

10. The heat shield system of claim 1, wherein said outer layer of said first outermost layered structure (12) has a wall thickness of approximately 100 μm, said dimpled layer of said first outermost layered structure (12 has a wall thickness of approximately 70 μm, and said inner layer of said first outermost layered structure has a wall thickness of approximately 50 μm.

11. The heat shield of claim 1, wherein said first outermost layered structure has a total thickness of approximately 4 mm, and said dimpled metal foil layer has a dimple-spacing of approximately 20 mm.

12. The heat shield system of claim 1, wherein said corrugated metal foil layers of said second intermediate layered structure (13) have a wall thickness of approximately 50 μm, a corrugation height of approximately 6 mm and a corrugation spacing of approximately 30 mm.

13. The heat shield system of claim 1, wherein said outer layer of said third innermost layered structure (15) has a wall thickness of approximately 30 μm, said dimpled layer of said third innermost layered structure (15 has a wall thickness of approximately 70 μm, and said inner layer of said third innermost layered structure (15) has a wall thickness of approximately 50 μm.

14. The heat shield system of claim 1, wherein said inner metal foil layer, said outer metal foil layer, and said dimpled metal foil layer of said first outermost layered structure, and said inner metal foil layer, said outer metal foil layer, and said dimpled metal foil layer of said third innermost layered structure, and said corrugated metal foil layers of said second intermediate layered structure, are made of at least one material selected from titanium alloys for operating temperatures up to 500° C., nickel alloys for operating temperatures up to 900° C., cobalt alloys for operating temperatures up to 1050° C., TD nickel chrome alloys for operating temperatures up to 1200° C., iron alloys for operating temperatures up to 1200° C., and refractory metals including molybdenum and their alloys.

15. The heat shield of claim 1, wherein said outer metal foil layer of said first outermost layered structure comprises an outer surface having a high thermo-optical emission coefficient of $\epsilon \geq 0.9$.

16. The heat shield system of claim 1, wherein all said foil layers other than said outer metal foil layer of said first outermost layered structure comprise surfaces having a relatively low thermo-optical emission coefficient of $\epsilon$ within the range of 0.1 to 0.3.

17. The heat shield system of claim 1, wherein said outer metal foil layer of said first outermost layered structure comprises a protruding cover flange (12d) extending along at least one edge of said panel for overlapping an edge of a neighboring panel to cover all expansion gaps.

18. The heat shield system of claim 1, further comprising expansion gaps between neighboring panels.

19. The heat shield system of claim 18, further comprising flexible ceramic fiber mats (17a) glued to edges of said panels for filling and sealing said expansion gaps.

20. The heat shield system of claim 18, further comprising compressed ceramic paper strips with a thickness of approximately 1 to 3 mm arranged to seal the bottom of said expansion gaps from said flying body, and a flexible underlayment such as polyimide foam or Nomese felt arranged between third innermost layered structure (15) and said flying body.

21. The heat shield system of claim 1, further comprising fastener means for securing said panels to said flying body in a removable manner.

22. The heat shield system of claim 1, further comprising porous material such as ceramic fibers arranged in spaces between said layers of said first outermost layered structure and of said third innermost layered structure.

23. The heat shield system of claim 1, wherein said dimpled metal foil layer of said first outermost layered structure comprises a honeycomb structure forming a spacer member, and each of said corrugated metal foil layers of said second intermediate layered structure corrugation ridges and valley forming spacer members.

* * * * *

UNITED STATES PATENT AND TRADEMARK OFFICE
CERTIFICATE OF CORRECTION

PATENT NO. : 4,925,134
DATED : May 15, 1990
INVENTOR(S) : Karl Keller et al.

It is certified that error appears in the above-identified patent and that said Letters Patent is hereby corrected as shown below:

Claim 4, Column 7, line 29, replace "Kaptan" by --Kapton--;
Claim 10, Column 7, line 64, replace "(12" by --(12)--;
Claim 13, Column 8, line 11, replace "(15" by --(15)--;
Claim 23, Column 8, line 66, after "structure" insert --comprises--.

Signed and Sealed this

Thirtieth Day of July, 1991

Attest:

HARRY F. MANBECK, JR.

Attesting Officer

Commissioner of Patents and Trademarks